United States Patent
Keys (10) Patent No.: US 8,955,009 B2
(45) Date of Patent: *Feb. 10, 2015

(54) VIEWING OF COMMERCIAL BREAK CONTENT DURING FAST-FORWARDING OF A VIDEO STREAM

(71) Applicant: Jeramie Jay Keys, Roswell, GA (US)

(72) Inventor: Jeramie Jay Keys, Roswell, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/311,327

(22) Filed: Jun. 22, 2014

(65) Prior Publication Data

US 2014/0304733 A1    Oct. 9, 2014

Related U.S. Application Data

(63) Continuation of application No. 11/618,846, filed on Dec. 31, 2006, now Pat. No. 8,763,028.

(51) Int. Cl.
| | |
|---|---|
| *H04N 7/10* | (2006.01) |
| *H04N 7/025* | (2006.01) |
| *H04N 9/79* | (2006.01) |
| *H04N 5/76* | (2006.01) |
| *H04N 5/783* | (2006.01) |
| *H04N 21/432* | (2011.01) |
| *H04N 21/44* | (2011.01) |
| *H04N 21/472* | (2011.01) |
| *H04N 21/81* | (2011.01) |

(52) U.S. Cl.
CPC . *H04N 9/79* (2013.01); *H04N 5/76* (2013.01); *H04N 5/783* (2013.01); *H04N 21/4325* (2013.01); *H04N 21/44016* (2013.01); *H04N 21/472* (2013.01); *H04N 21/812* (2013.01)

USPC .......................................................... 725/32

(58) Field of Classification Search
USPC ........ 725/19, 86, 93, 40, 32, 89, 46; 345/716; 348/661; 365/200; 386/68
See application file for complete search history.

(56) References Cited

U.S. PATENT DOCUMENTS

| | | | |
|---|---|---|---|
| 6,909,837 B1* | 6/2005 | Unger | 386/343 |
| 2002/0144262 A1* | 10/2002 | Plotnick et al. | 725/32 |
| 2002/0144274 A1* | 10/2002 | Gaviot et al. | 725/86 |
| 2003/0058707 A1* | 3/2003 | Dilger et al. | 365/200 |
| 2003/0093792 A1* | 5/2003 | Labeeb et al. | 725/46 |
| 2003/0208767 A1* | 11/2003 | Williamson et al. | 725/93 |
| 2004/0070594 A1* | 4/2004 | Burke | 345/716 |
| 2006/0168630 A1* | 7/2006 | Davies | 725/89 |
| 2006/0187358 A1* | 8/2006 | Lienhart et al. | 348/661 |
| 2006/0206912 A1* | 9/2006 | Klarfeld et al. | 725/40 |
| 2008/0155585 A1* | 6/2008 | Craner et al. | 725/32 |
| 2008/0193102 A1* | 8/2008 | Tischer | 386/68 |

* cited by examiner

*Primary Examiner* — Nasser Goodarzi
*Assistant Examiner* — An Nguyen
(74) *Attorney, Agent, or Firm* — Withers & Keys, LLC (57) ABSTRACT

Commercial break content that is viewed during fast-forwarding through a commercial break is provided by embedding one or more frames of commercial break content at various points in time during a commercial break segment. During fast-forwarding, the video stream for at least some of those points in time are displayed by the recording device to the viewer. Accordingly, multiple occurrences of frames that have been embedded are displayed during the fast-forwarding such that the commercial break content expressed by the frames is conveyed to the viewer during the fast-forwarding period.

20 Claims, 7 Drawing Sheets

VIEWING OF COMMERCIAL BREAK CONTENT DURING FAST-FORWARDING OF A VIDEO STREAM

TECHNICAL FIELD

Embodiments provide for the viewing of commercial break content. More particularly, embodiments provide for the viewing of commercial break content during the fast-forwarding of a video stream.

BACKGROUND

Personal video recorders (PVR), also known as digital video recorders (DVR), and service provider enabled video-on-demand (VOD) have made it possible to watch television programming with much greater flexibility for the viewer. These technologies give the television viewer the ability to watch the programming whenever the viewer wishes rather than at the normal time that the programming is aired by the television network. Thus, many television viewers have purchased PVR devices to use in conjunction with their cable, satellite, and/or over-the-air television service and/or have subscribed to VOD service.

Typically, the commercial breaks are recorded for playback with PVR devices and/or VOD service. Therefore, the user may watch those commercial breaks while watching the programming at the desired time. However, such recorded programming via the PVR device or VOD service provides the viewer with more advanced functions such as the ability to quickly fast-forward through commercial breaks. For example, many PVR devices allow fast forwarding at a rate of 1 minute of playback time per second. For a three-minute commercial break, the commercial break takes only three seconds to skip. During this three seconds, the viewer is exposed to scattered frames of the commercial break, each scattered frame appearing for only small fraction of a second.

Perhaps the majority of television viewers who use PVR devices or VOD service choose to fast-forward through the commercial breaks and absorb little if any of the commercial content that is present. This is the case because the scattered frames provide just enough visual information for the viewer to recognize when the commercial break has ended and the television show being watched has resumed. This fast-forwarding through commercial breaks poses a substantial problem for advertisers and television networks because the value of the commercial time being purchased by the advertisers is greatly diminished by the fast-forwarding through the commercial break.

SUMMARY

Embodiments address these issues and others by providing one or more frames of commercial break content that are embedded at a plurality of points during a commercial break segment. When the fast-forwarding occurs, among the scattered frames that are displayed during the fast-forwarding, a substantial number of the embedded frame(s) will be displayed such that the viewer absorbs the commercial break content from those embedded frame(s) for a given commercial break. Accordingly, while normal commercial content of the commercial break is skipped altogether or otherwise incomprehensible during the fast-forwarding, the multiple occurrences of the display of the embedded frame(s) allow an advertising message to be conveyed to the viewer.

Embodiments provide a method of providing commercial break content during the fast-forwarding of a video stream. The method involves providing at least one frame of commercial break content video. The method further involves embedding within a commercial break segment of the video stream at a plurality of points at least one frame of video containing the commercial break content, at least a portion of the plurality of points corresponding to fast forward display points of a video recording device capable of recording and fast-forwarding through the video stream, where the plurality of points are separated in time.

Embodiments provide a computer system for generating a video stream including commercial break content. The computer system includes at least one input device and an output device. The computer system further includes a processor configured to receive commercial video and at least one frame of commercial break content via the at least one input device and to create a commercial break segment by embedding at least one still frame of the set at each of a plurality of points within the commercial video. The points of the plurality are separated in time with at least some commercial video other than the at least one frame of commercial break content being located in time between each of the points of the plurality. The processor is further configured to output the commercial break segment via the output device.

DETAILED DESCRIPTION

Embodiments provide commercial break content for viewing during fast-forwarding. The commercial break content is included as frames embedded at various points in time during a commercial break. Accordingly, during fast-forwarding, the playback device displays the video stream for at least a portion of those points in time such that multiple occurrences of the frame(s) of commercial break content that have been embedded are displayed to the viewer. The exposure to the multiple occurrences during the fast-forwarding increases the likelihood that the viewer is absorbing the commercial break content, and as a result, the value of the commercial break content of the video stream that has been recorded is increased.

The one or more frames of commercial break content that are embedded in a video stream for display during the commercial break, particularly during fast-forwarding of the commercial break, may have many variations. For example, a single frame of commercial break content may be repeated at each of the pertinent points throughout the commercial break. In such a case, for a PVR capable of covering a 3 minute commercial break in 3 seconds during fast-forwarding, the viewer is subjected to approximately 3 seconds of the single frame of commercial break content such that the viewer is more likely to absorb the content. Advertisers are more likely to get the benefit of their money spent on the advertising time.

As another example of the variation in the commercial break content, at least some of the frames of commercial break content that are to be displayed over the series of pertinent points of the commercial break may be a sequence of slightly different frames, as opposed to repeating a single frame, so as to give the appearance of motion of objects or text. In such a case, for a PVR capable of covering a 3 minute commercial break in 3 seconds during fast-forwarding, the viewer is subjected to approximately 3 seconds of the sequence. As a specific example, if the PVR is displays a pertinent point in the video stream for every 8 seconds of normal playback time, then the sequence would have approximately 7 frames per second for a total of about 21 frames for the entire sequence over the course of the commercial break during fast-forwarding.

As yet another example of the variation in the commercial break content, at least some of the frames of commercial break content may be less than full frame, such as where ordinary commercial content is displayed in at least a portion of the frame while the embedded content is displayed in another portion or superimposed over the ordinary commercial content.

As yet another example of the variation of the commercial break content, at least some of the frames of the commercial break content may be taken from the television program being watched by the viewer. Thus, during the fast-forwarding, the viewer sees the one or more frames taken from the television program being watched and mistakenly believes that the commercial break has now been skipped. Upon stopping fast-forwarding in order to begin watching the television program at normal playback speed, the video stream being displayed is actually the commercial break segment such that the viewer is exposed to the commercial content during normal playback speed. The net result may be that over time, the viewer is frustrated during fast-forwarding and decreases the likelihood of the viewer fast-forwarding through commercial breaks.

Figure 1:
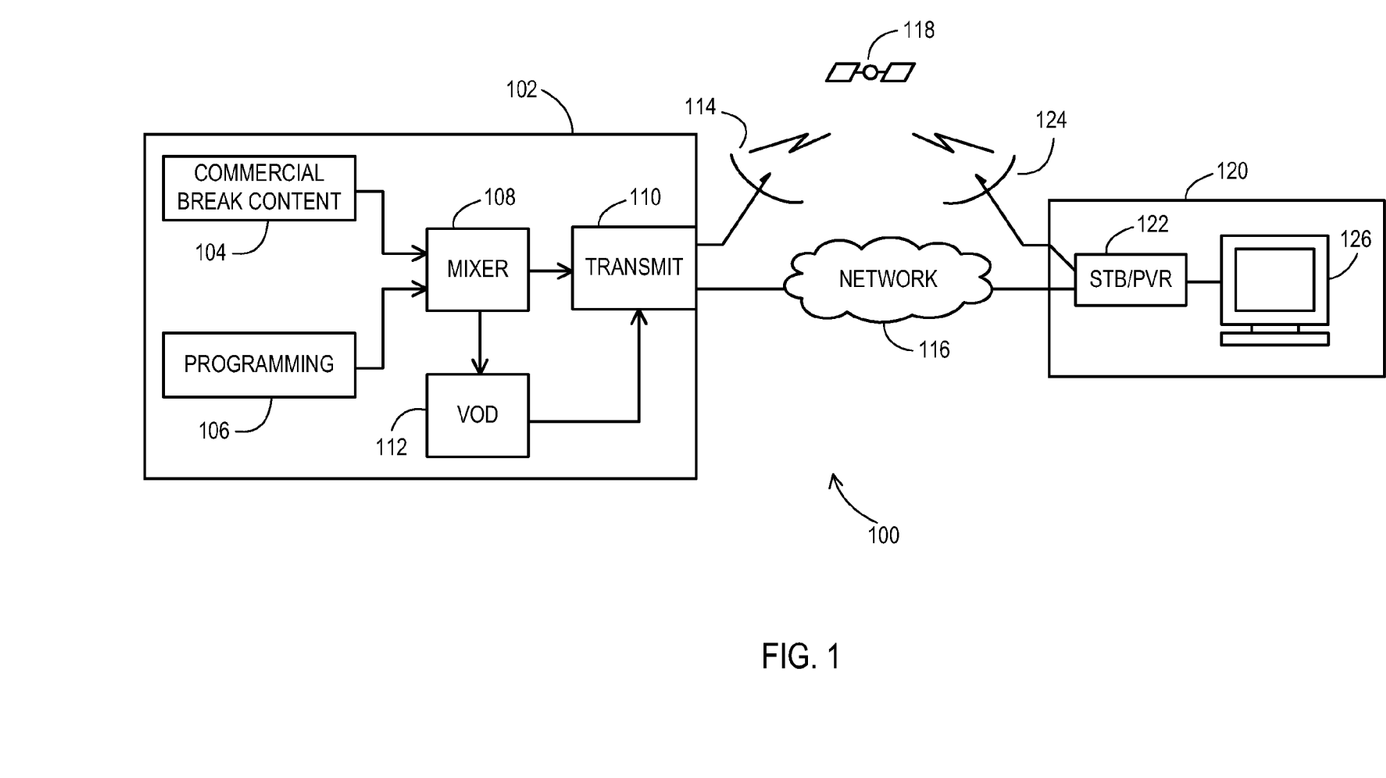
FIG. 1 shows an example of a television network system that creates and distributes commercial break content for viewing during the fast-forwarding of commercial breaks by a PVR or VOD service.

FIG. 1 shows an example of a television distribution environment 100. A television station head-end 102, such as a national television network broadcasting point, a local television network broadcasting point, and the like, generates a video stream that is submitted downstream to television viewers. In this example, the head-end 102 includes storage 104 of commercial break content as well as storage 106 of the television programming. The television programming of storage 106 may already have commercial breaks within the video stream where those commercial breaks may contain normal commercial content intended for normal speed playback.

The commercial break content of storage 104, which may be of any variation such as any one or more of those previously discussed, is mixed together with the programming of storage 106 with the mixer device 108. The frame to be embedded is added to the video stream at the pertinent point in playback time by the mixer 108 such that during fast-forwarding, when the pertinent point is reached and is displayed, it is the embedded commercial break content frame that is displayed rather than some arbitrary frame of the normal commercial content of the programming. The mixer 108 adds the appropriate frame of commercial break content from storage 104 to each of the pertinent points within the commercial breaks of the programming of storage 106.

The mixer 108 may be operated on a manual or automated basis in order to embed the frames of commercial break content. The mixer 108 may find the pertinent points to embed the frames of commercial break content by finding the beginning of the commercial break. This may be tagged in some manner such as simply by having one or more blank frames as the start frames of the commercial break, where these blank frames are detectable by the mixer 108 operating as an automated device. Where the mixer 108 is operated as a manual device, the beginning of the commercial break is visually detectable by the operator.

The mixer 108 may operate to create a video stream that includes the commercial break content embedded at the pertinent points either in a real-time scenario for an automated mixer 108, or in advance of playback of the video stream for either a manual or automated mixer 108.

The mixer 108 outputs the resulting video stream containing the programming with the commercial breaks having normal commercial content as well as the commercial break content embedded at the pertinent points, to either a VOD system 112 and/or to a transmission system 110. The VOD system 112 may store the video stream including the embedded commercial break content for future playback upon request by a subscriber. In that case, upon receiving a fast-forward command, the pertinent points being displayed, and therefore, the commercial break content that has been embedded at those pertinent points is what is seen by the viewer during the fast-forwarding. As an alternative, the programming may be maintained long-term within storage 106 such that the VOD system 112 may access the programming from storage 106 via the mixer 108 whereby when the VOD system 112 receives fast-forwarding commands from viewers, the VOD system 112 may then obtain the commercial break content frames from the mixer 108 on the basis of having received the fast-forward command. The VOD system 112 may thereby begin providing the video stream with the commercial break content frames being inserted in real-time at the pertinent points which are being seen by the viewer during the fast-forwarding.

The mixer 108 may also output the video stream having the commercial break content frames embedded at the pertinent points directly to the transmission system 110. At the transmission system 110, the video stream(s) including the embedded commercial break content are queued for regular broadcast television transmission to viewers through the convention channels of television distribution. Likewise, the video streams from the VOD system 112 may be provided to the transmission system 110 for distribution to viewers. For example, the transmission system 110 may have a satellite uplink 114 to satellite 118 and/or may maintain a link to a land-based distribution network 116 such as a cable network or an over-the-air distribution system.

On the receiving end, a consumer premises 120 includes a receiving device, such as an STB or PVR 122 connected to a viewing device such as a television 126. The receiving device has some interface to a distribution system of the television service provider, such as a link to the distribution network 116 or satellite receiving dish 124. The viewer at premises 120 may wish to fast-forward through commercial breaks where the incoming video stream has been recorded by a PVR 122 or where the STB or PVR 122 is receiving VOD programming. The STB or PVR 122 receives an instruction from the viewer, such as by receiving a signal sent from a remote control of the viewer, and then proceeds to fast-forward through the commercial break. However, when the pertinent points in playback time are displayed, rather than viewing only the arbitrary and scattered frames of the normal commercial content, the viewer instead views at least some of the embedded frames of commercial break content.

Figure 2:
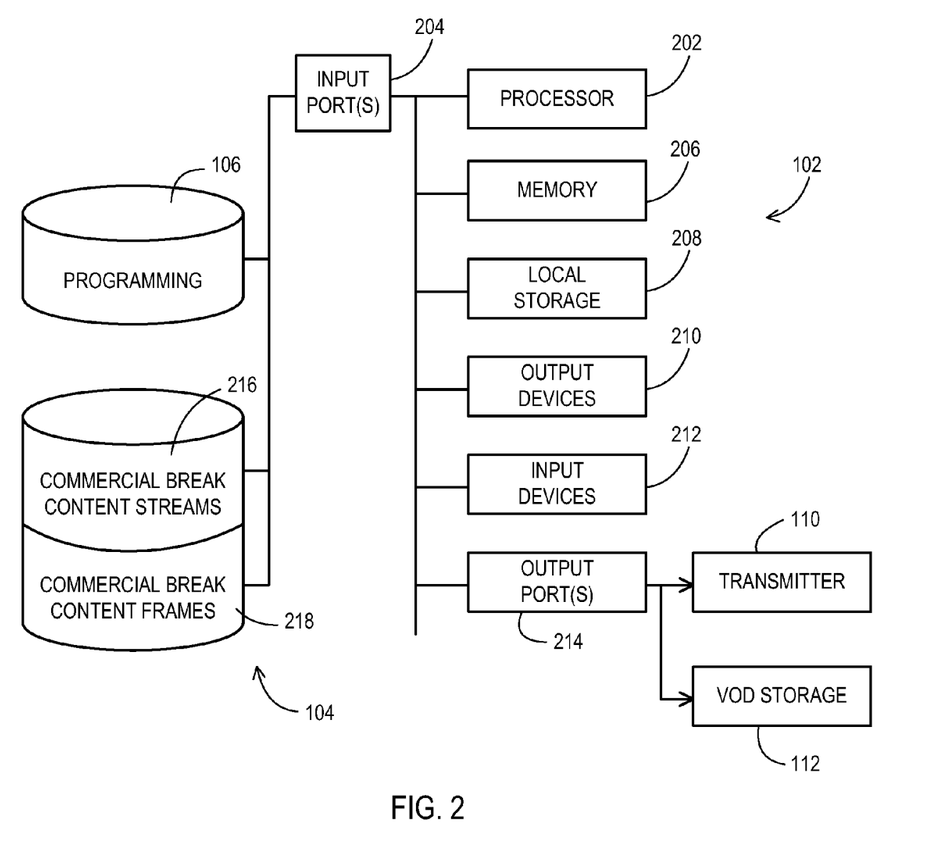
FIG. 2 shows an example of a network computer system that embeds frames of commercial break content at points where that will be displayed during fast-forwarding through commercial breaks.

FIG. 2 shows an example of the head-end system 102 and particularly, various components of one example of a mixer 108. The programming from storage 106 and commercial break content of storage 104, such as individual frames 218 as well as streams 216 that include a sequence of frames, are provided via input port(s) 204 to the mixer 108. The video streams of programming and the video frames may be stored in a digitized format or in an analog format. The input ports 204 may be either analog or digital video signal inputs. A processor 202 operates upon the incoming video streams and frames to embed the commercial break content frames within the commercial content that is inserted into the commercial breaks of the programming. The processor 202 may be a dedicated purpose, hard-wired processor, a general purpose programmable processor, or any combination thereof. Where the processing of the video frames is done in the digital domain but the video streams and frames are stored in analog format, the input ports 204 may include analog to digital conversion.

The processor 202 may access programming instructions and may store information within memory 206, which may include random access memory, read-only memory, or any combination thereof. The processor 202 and memory 206 are examples of computer readable media where computer programming instructions are maintained. Computer readable media may include storage media such as electronic, magnetic, and optical storage devices, as well as communications media such as wired and wireless connections of devices.

Local storage device 208, such as a mass storage drive, may also be present for the mixer device 108 to also store application programs and other instructions for the processor as well as to provide additional storage typically of a greater capacity than that of the memory 206. For example, incoming video streams and frames in digitized form may be stored in local storage device 208 prior to the frames of the commercial break content being embedded into the video stream of the program. Furthermore, the resulting video stream that includes the embedded commercial break content frames may be stored in the local storage device 208 prior to being output to the appropriate system.

The mixer 108 may include output devices 210 such as audio outputs and video outputs so that an operator may see and hear the video streams, frames, and resulting video streams. Furthermore, the video output may provide the operator with a user interface for configuring the mixer and/or manually controlling the embedding of the commercial break content frames within the video stream of the desired program.

The mixer 108 may include input devices 212 such as a keyboard, mouse, and the like to allow an operator to provide inputs to control the operation of the mixer 108. The operator may provide inputs to control the embedding process, to control the outputting of the video streams, to accept incoming video streams and frames, and so forth.

The mixer 108 may also include output ports 214 such as to output a video stream to the appropriate downstream system. For example, there may be provided an output port 214 that provides a video stream to a transmitter 110 for real-time or near real-time distribution to viewers. There may be provided an output port 214 that provides a video stream to a VOD storage system 112 for distribution to a viewer upon request. As previously discussed, the mixer 108 may embed the commercial break content frames at the pertinent points of the commercial break in advance of distribution to viewers or in real-time, such as upon request by a viewer to begin fast-forwarding. The output ports 214 may be analog or digital depending upon the format of the video streams when being manipulated by the mixer 108 and the format required by the downstream system. The output ports 214 may include digital to analog converters where the mixer 108 manipulates the video stream in the digital domain but the downstream systems require an analog video stream.

As shown in FIGS. 1 and 2, the storage devices 104 and 106, the mixer 108, the transmission system 110, and the VOD system 112 are separate components to the head-end system 102. However, it will be appreciated that these components may be combined in various manners, such as combining the mixer 108 with the transmission system 110.

Figure 3:
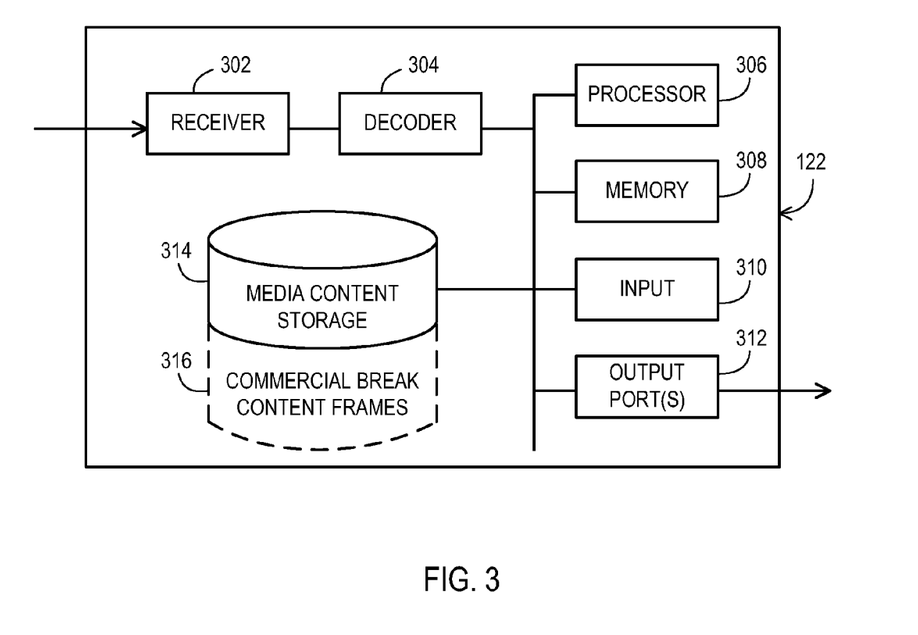
FIG. 3 shows an example of a PVR device that fast-forwards through a commercial break that has frames of commercial break content for viewing during fast-forwarding embedded within it.

FIG. 3 shows an example of an STB/PVR 122 that receives video streams from a distribution channel and outputs them to a display device such as a television where they can be seen by a viewer. The incoming television distribution signals such as from a satellite, a land-based network, or over-the-air are received by receiver 302 which then tunes to the appropriate channel as selected by the viewer. The video stream from the channel is then operated upon in one of various ways depending upon the functionality present within the STB/PVR 122.

Where the video signal has undergone digital encoding, then a decoder 304, such as a motion picture experts group (MPEG) decoder may conventionally decode the video signal and then provide it to output port(s) 312 where the video signal may then be transferred to a television for real time display such as in the case of a non-PVR STB 122 or for a PVR STB 122 that provides for real-time display in addition to a buffered display.

In the context of a non-local storage VOD system, the STB 122 may simply display the incoming video stream, whether it is a normal playback speed or a fast-forward speed as established at the VOD system of the head-end. In that case, where the viewer has opted to fast-forward and the VOD system begins sending the fast-forward of the video stream by sending the series of frames located at the pertinent points in time, then the commercial break content frames embedded at those pertinent points in time are displayed for the viewer.

In the context of a PVR system and/or a local storage VOD system, the PVR 122 may record the incoming video stream to a storage device 314 for storing media content such as the program currently being received but not necessarily being watched in real-time or near-real-time. The receiver 302 may provide the encoded signal to the storage device where it is stored in the format in which it has been received. Alternatively, a decoder 304 of some embodiments may decode the incoming signal and encode it using a custom encoding specified by the PVR 122 prior to it being stored locally.

In the context of this PVR system, instead of viewing in real-time, the viewer may wish to playback the program at a different time and the program is accessed from media storage 314. During playback, the viewer may elect to fast-forward through commercial breaks, and the video stream that has been received from the head-end 102 already has embedded therein at the pertinent points the commercial break content frames. A processor 306 of the PVR 122 receives the fast-forward instruction via input device 310 such as a touch button or a remote control signal sensor, and the processor 306 begins pulling the frames at the pertinent points in time from the media storage 314, decoding them via the decoder 304, and outputting them via output port(s) 312 for display to the viewer. However, rather than only arbitrary frames of commercial content being displayed, at least some of the embedded frames of commercial break content are displayed during the fast-forwarding.

The processor 306 of this example of a PVR 122 may be a dedicated purpose hardwired processor, may be a general purpose programmable processor, or some combination thereof. The processor 306 may access instructions and other information from memory 308 and may also store information within memory 308. Memory 308 may be volatile memory such as random access memory, non-volatile memory such as read only memory, or some combination thereof. The processor 306 and memory 308 of the PVR 122 are further examples of computer readable media.

Output port(s) 312 may be of various types. Examples of the output from the PVR 122 include but are not limited to a radio frequency modulated analog signal via a coaxial output, a base band analog signal via a composite jack, a base band analog signal via an S-video jack, a base band analog signal via component video jacks, or a digital signal via a digital video interface (DVI) or high definition multi-media interface (HDMI) jack.

As an alternative to or in addition to the head end embedding commercial break content frames into the video stream at the pertinent points in time, the PVR 122 may do so. The PVR 122 may store the commercial break content frames in storage 316. Upon the processor 306 receiving the fast-forward command from the user via the input device 310, the processor 306 may begin pulling the commercial break content frames from storage 316 and displaying them at the pertinent points in time of the video stream by decoding them via decoder 304 if necessary and outputting them via the output port(s) 312. In this alternative implementation, there is a distinct advantage due to the PVR having awareness of exactly which points in time of the commercial break are the pertinent points where display of the corresponding frame(s) will occur such that the PVR may very accurately insert the commercial break content into the correct points in time for display to the viewer.

In this alternative implementation, the PVR 122 may have no knowledge of how lengthy the commercial break being fast-forwarded over is, so in order to avoid having the real-time embedded commercial break content frames continue into the program being watched, the PVR 122 may assume a standard commercial break length such as 3 minutes. After 3 minutes, the PVR 122 may resume display of frames from the program that have been recorded into storage 314 at the pertinent points in time during the fast-forwarding. In this manner, the viewer will eventually see the frames of the program being watched so that the viewer will recognize that the commercial break has ended and the normal speed playback of the program may resume.

In this alternative implementation, the PVR 122 becomes the commercial break content source. Accordingly, the PVR 122 must obtain the commercial break content frames through some manner of download or have them pre-installed. Even if pre-installed, it would be desirable to update the commercial break content in storage 316 of the PVR 122. This may occur through well-known mechanisms for providing commercial content to PVRs, such as late night service downloads, and so forth. Since the commercial break content for a given commercial break may be as few as 20 frames of a sequence, or even a single frame where repeated for all pertinent points in time of the commercial break, the amount of video to download for a given commercial break is relatively small and would have little impact on the service download process. The PVR service provider may derive additional revenue by offering this as an advertisement service to advertisers and/or networks.

Figure 4:
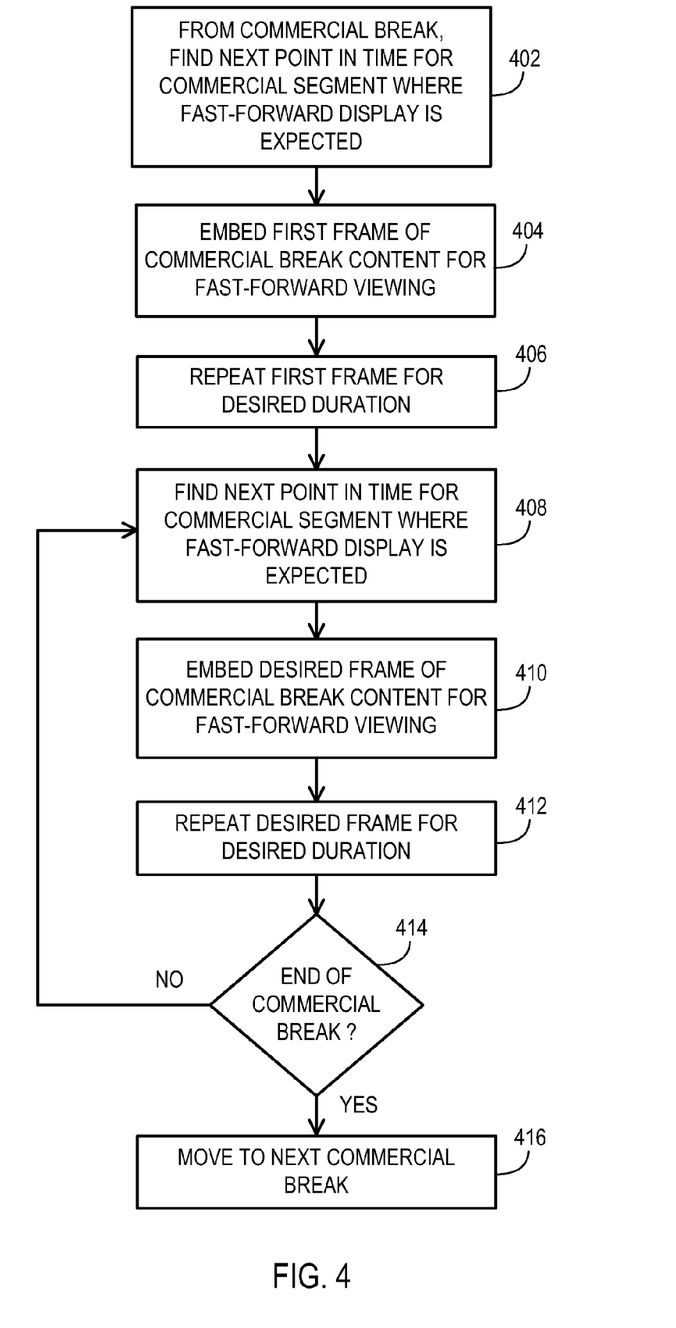
FIG. 4 shows an example of a set of logical operations for adding commercial break content for viewing during fast-forwarding to a video stream.

FIG. 4 shows a set of logical operations that may be performed to embed the commercial break content frames into the video stream so that the commercial break content is displayed during fast-forwarding through the commercial break. At commercial segment operation 402, the device performing the embedding, such as the head-end mixer or the PVR of the customer, finds the pertinent point in time within a commercial break for the embedding of one or more frames of commercial break content. To find this point in time, a beginning of a commercial break is found such as by scanning for the blank screen that precedes the initial commercial of the commercial break. Upon finding this blank screen, the pertinent time is found on the basis of a point in playback time starting from the blank screen where the PVR or VOD will obtain and display a frame. This point in time may be known information or may be determined empirically. For example, it has been observed that if a user immediately enters the triple-speed fast-forward upon an occurrence of the blank screen using a TiVo® PVR, the PRV will begin displaying frames at a relatively steady pace at approximately the 22 second mark on the normal playback speed timeline. Thus, the first point in time may be 22 seconds and 22 seconds beyond the blank screen is located.

After having located the first pertinent point in time on the normal speed playback timeline, the device embeds the first frame of commercial break content for fast-forward viewing at that point in time at insertion operation 404. The embedding may involve creating a gap at the pertinent point in time, e.g., starting at the 22 second mark after the blank screen, where the gap has a width in time sufficient to accept a desired duration of the commercial break content frame being embedded. As discussed below, it may be desirable to repeat the commercial break content frame over a particular duration to better ensure that the frame will be displayed due to variation in the timing of the user entering the fast-forward instruction. The commercial break content frame is repeated at the pertinent point in time for the desired duration at duration operation 406.

When performing the embedding at the head-end, the normal commercial content may have been designed to accommodate the commercial break content that is being embedded at the pertinent points in time where the commercial break content dominates the frame. Thus, for a 3 minute commercial break, the network may instruct advertisers to provide 22 second long commercials instead of 30 second long commercials so that the embedded commercial content may have a duration of 2 seconds at each pertinent point in time, with 4 pertinent points in time per 30 second commercial. Accordingly, adding the roughly 16-20 frames of commercial break content across the 16-20 pertinent points in time, each frame having a duration of 2 seconds of normal playback time, to the eight 22 second commercials results in a 3 minute normal playback time commercial break.

If the commercial content frames do not dominate the frame but merely share the full frame with the normal commercial content, such as by being superimposed or overtaking a corner of the frame, then the normal commercial content may remain at its normal length in time such that the advertisers need not alter the length of the commercial content since the commercial break content that has been embedded is a simultaneous display with the normal content at the pertinent points in time. However, advertisers may be instructed to avoid using a certain corner or other location of the full frame where the commercial break content may be imposed. As discussed below, where the television channel broadcasts a 16:9 widescreen aspect ratio but the commercials are a 4:3 aspect ratio, then no consideration need be given the embedding of the commercial break content into the blank portion of the 16:9 full frame at the pertinent points in time.

When performing the embedding at the PVR, the normal commercial content put in place at the head end will likely be designed to fill the 3 minute commercial break. Thus, the PVR may overwrite the existing commercial content at each of the pertinent points where the commercial break content is embedded where the commercial break content dominates the frame. As discussed above, alternatives include superimposing the commercial break content over the normal commercial content such as overtaking a corner of the full frame to include the commercial break content. Alternatives further includes including the commercial break content in the blank area of a 16:9 aspect ratio frame where the normal commercial content is a 4:3 aspect ratio frame and only fills a portion of the 16:9 aspect ratio frame.

The next pertinent point in time, which is the next point in playback time where a frame is expected to be displayed during the fast-forwarding, is found at commercial segment operation 408. This pertinent point in time may be found by moving forward in normal playback time by the amount of time that is expected to be skipped over by the VOD or PVR system during the fast-forwarding. This amount of time may be known for the VOD or PVR system or may be empirically determined. For example, it has been observed that a TiVo® PVR skips forward on average about 8 seconds during triple-fast-forwarding (i.e., 60 times faster than normal playback speed) from one pertinent point to the next.

At insertion operation 410, the desired frame is embedded in the video stream at the current pertinent point. This desired frame may be a repeat of the frame from the previous pertinent point, or it may be a different frame, such as the next frame in a sequence of frames of commercial break content. This frame is repeated for the desired duration at the current pertinent point. Query operation 414 then detects whether the end of the commercial break has been reached such as be determining whether the blank screen that ends the commercial break is reached prior to reaching the next pertinent point. If not, then operation flow returns to commercial segment operation 408 to find the next pertinent point of this commercial break. If the end of the commercial break is reached, then the device performing the embedding moves on to the next commercial break at segment operation 416 by looking for the next blank screen that indicates the beginning of another commercial break segment. Once the next commercial break segment has been found, these logical operations of FIG. 4 repeat in order to embed the commercial break content within this next commercial break.

In either the case of the head end or the PVR embedding commercial content frames as a portion of a full frame with the remaining portion of the full frame being the normal commercial content or when sharing a 16:9 aspect ratio frame with normal commercial content, a different embedding approach may be utilized. Since the normal commercial content is displayed simultaneously with the commercial break content in this situation, the commercial break content may be included for the entire commercial break to further ensure that the commercial break content will be displayed for the viewer during fast-forwarding through the commercial break. Where a sequence of commercial break content frames will be used during a commercial break, such as to show movement of an object or text, the duration of each commercial break content frame may be extended for the full period between pertinent points, such as 8 seconds with the occurrence of the frames being adjacent in time to fill the commercial break segment.

Figure 5A:
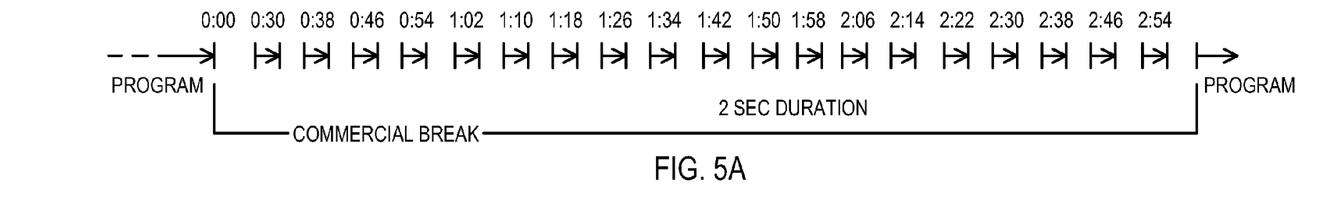
FIGS. 5A-5D show examples of a timelines of a television program including commercial break segments that have commercial break content for viewing during fast-forwarding.

FIGS. 5A-5D illustrate timelines of normal playback speed with a video stream transitioning from a program to a commercial break and back to the program. FIG. 5A shows one example of a 3 minute commercial break timeline with commercial break content embedded within it. In this example, the initial pertinent point in normal playback time is at the 0:30 mark after the occurrence of the blank screen separating the program and the commercial break. It is expected that upon a user selecting to fast-forward at the start of the commercial break, this 0:30 mark will be a point where the VOD or PVR system will display a frame to the viewer. The commercial break content frame is embedded at this point and is repeated for 2 seconds of normal playback time so that the first embedded frame runs from 0:30 until 0:32. The period between the pertinent points in this example is 8 seconds such that the next pertinent point in time where it is expected that a frame will be displayed during fast-forwarding is 0:38. Normal commercial content will be present between 0:32 and 0:38 and will be viewed during normal speed viewing of the commercial break. This pattern of an 8 second period with a 2 second repeated commercial break content frame continues for the remainder of the 3 minute commercial break.

During triple-speed fast-forwarding by a TiVo® PVR, where 60 seconds are traversed in 1 second with roughly 8 frames being displayed over the 60 seconds being traversed such that each is displayed for only a small fraction of a second, the 3 minute commercial break is traversed in roughly 3-4 seconds yet the viewer is exposed to as many as 19 frames of commercial break content during the fast-forwarding. Thus, to the extent there is some degree of continuity across those 19 frames, the viewer is likely to absorb at least some of this commercial break content. With 19 frames, even if the viewer misses some of them, it is likely that several will be displayed. Where the commercial break content is commercial content, it is likely that the viewer will recognize the source and product or service being advertised. Where the commercial break content is content from the program being watched, it is likely that the viewer will mistakenly think the commercial break has been skipped and will stop fast-forwarding which will result in normal speed playback of the commercial break.

Figure 5B:
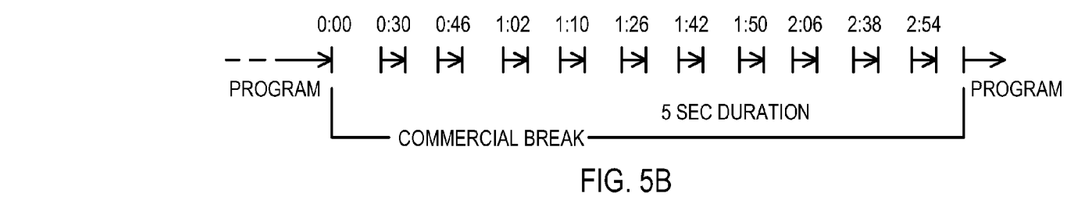

FIG. 5B shows another example of a commercial break timeline where fewer pertinent points have been chosen and the duration of each has been increased to 5 seconds. Here, the pertinent points that have been chosen match some of the pertinent points from FIG. 5A. With the fewer number, the impact on the viewer who is not fast forwarding is decreased as there are fewer commercial break content frames that will be experienced during the commercial break. With the increased duration, the likelihood of each one of the commercial break content frames being displayed during fast-forwarding is increased. Additionally, in this example, the time spacing between adjacent pertinent points in playback time is varied which may also lessen the impact during normal speed viewing of the commercial break content. This variation in time spacing with increased duration of the commercial break content frame may lessen the impact of a PVR or VOD service creating variation in the spacing between the points in playback time that are actually being selected for display during fast-forwarding.

Figure 5C:
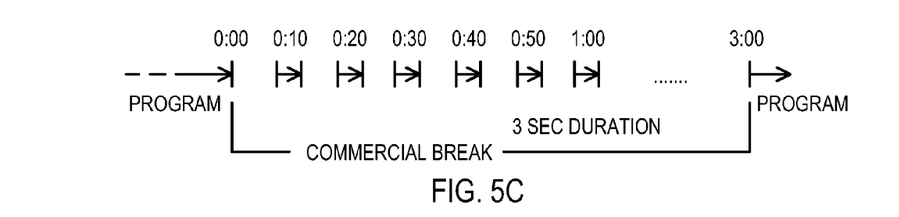

FIG. 5C shows another example of a commercial break timeline using a 10 second period of the pertinent points with a 3 second duration of the commercial break content frames being embedded. This spacing may be useful in an attempt to provide the commercial content frames during normal fast-forwarding and also during large-chunk fast-forwarding (i.e., repeatedly jumping 30 seconds forward using a commercial skip instruction). Here, some of the pertinent points in playback time will match some of the pertinent points in playback time of the example of FIG. 5A. The 0:30 mark with 3 second duration of FIG. 5C will overlap with the 0:30 mark with 2 second duration of FIG. 5A. Likewise, the 1:00 mark with 3 second duration of FIG. 5C will overlap with the 1:02 mark with 2 second duration of FIG. 5A, and so on. Furthermore, at each of the 30 second spacings from the beginning of the commercial break (i.e., 0:30, 1:00, 1:30, and so on), the commercial content frame is being embedded with a 3 second duration such that for each repeated instance of the commercial skip function during the commercial break, the embedded commercial break content frame will be displayed to the viewer.

Figure 5D:
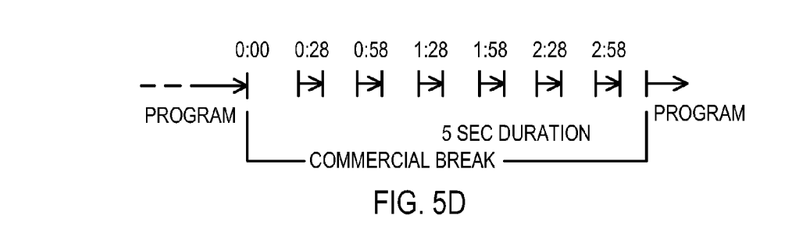

FIG. 5D shows another example of a commercial break timeline using a 30 second period of the pertinent points with a 5 second duration of the commercial break content frames being embedded. This configuration may have similar goals to that of FIG. 5C, such as to primarily target the large-chunk fast-forwarding but to also address normal fast-forwarding while reducing the impact on normal speed viewing of the commercial break. Again, there is overlap between many of the pertinent points with 5 second duration of FIG. 5D and several of the pertinent points of FIG. 5A.

Each of the examples shown in FIGS. 5A-5D are for purposes of illustration and are not to be considered limiting. It will be appreciated that many variations are possible regarding the timing of the pertinent points, the duration of the embedded commercial break content frames, and so forth. It will be further appreciated that the timing and duration chosen may be on the basis of targeting a particular PVR or VOD service. For example, one may determine what the most prevalent PVR or VOD service is and then configure the timing of the pertinent points and the duration of the embedded frames to best cooperate with that most prevalent PVR or VOD service. Furthermore, the timing and duration that is chosen for embedding the frames may evolve over time as the functionality of PVRs and VOD services change.

The frame is repeated for a given duration at each of the pertinent points in order to increase the likelihood of the frame being displayed during fast-forwarding by the PVR or VOD service. PVR devices and VOD service may base the points in playback time for display during fast-forward based on when the fast-forwarding begins, rather than selecting points in time to display regardless of when fast-forwarding begins. So, the duration of the frame at a given pertinent point allows there to be variation in the start time of the fast-forwarding from one viewer to the next. Some viewers may begin the fast-forwarding at the immediate beginning of the commercial break while other viewers may delay the fast-forwarding by a second or two due to a different reaction time, a more lethargic use of the fast-forwarding function, and so forth. By having a width in time of the embedded frame, some viewers may see the occurrence of the embedded frame located at the very beginning of the pertinent point in time (e.g., at precisely 0:30.0 on the timeline of FIG. 5A). Other viewers may see the occurrence of the embedded frame located at the very end of the duration at the pertinent point in time (e.g., at 0:31.9 on the time line of FIG. 5A) due to a second or two delay in initiating the fast-forwarding relative to those who saw the occurrence located at 0:30.0.

Figure 6A:
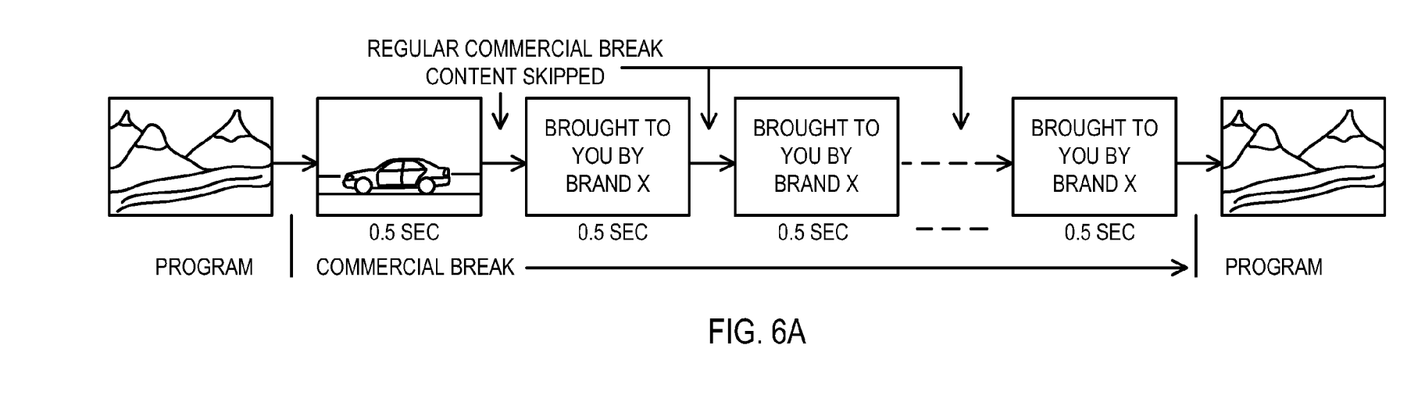
FIGS. 6A-6D show examples of series of commercial break content frames being displayed for the viewer during fast-forwarding of a video stream.

FIGS. 6A-6D show examples of the display of embedded commercial break content frames during the fast-forwarding through commercial breaks. In the example of FIG. 6A, the commercial break content frame that has been embedded is a full frame such that when it is displayed, the normal commercial content is not. In this example, the television program is showing a mountain scene. The commercial break begins with a commercial about an automobile. During the fast-forwarding, a frame from the commercial about the automobile is shown for a fraction of a second and then a frame at a next pertinent point is displayed. In this example, the next frame being displayed is the commercial break content frame that has been embedded at the pertinent points where it is expected that the display by the PVR or VOD service will occur.

In the example of FIG. 6A, the embedded frame of commercial break content is itself commercial content. The commercial break content frame in this example is an advertisement for Brand X. In this example, the same frame is repeated at each of the pertinent points. Thus, the viewer is repeatedly exposed to the same frame throughout the commercial break that is being fast-forwarded over. In the example of FIG. 5A, the viewer may be exposed to this Brand X advertisement as many as 19 times. At least some of the normal commercial content located between each of the embedded commercial break content frames is skipped as would be the case had the embedded frames not been present. The embedded frames of commercial break content may not be identical. For example, the color of the background and/or text may change from one pertinent point being displayed to the next. The text may be positioned differently from one pertinent point being displayed to the next to give the appearance of motion of the text to further capture the attention of the viewer.

Figure 6B:
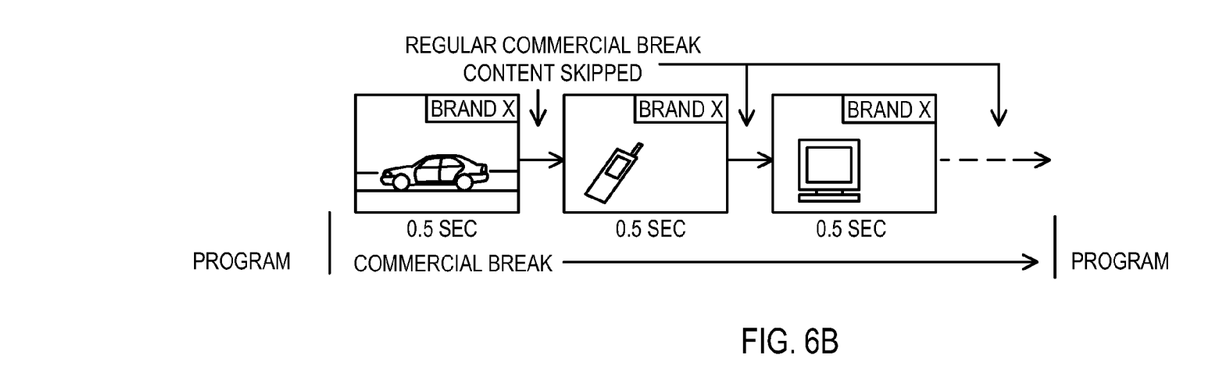

In the example of FIG. 6B, the embedded frames of commercial break content are only partial frames that have been imposed over frames of normal commercial content. Here, at each of the pertinent points, the normal commercial content frame is still displayed but the partial frame of commercial break content has also been embedded. Accordingly, when viewed during fast-forwarding, it appears to the viewer that most frames being seen have the embedded commercial break content such that the viewer is able to comprehend and absorb that information. The remaining portion of the frames being displayed during fast-forwarding may continue to have the arbitrary normal commercial content that the viewer is unlikely to absorb, especially due to the presence of the embedded commercial content that draws the attention of the viewer.

In this example of FIG. 6B, one displayed frame during fast-forwarding includes content from a commercial about an automobile while the embedded content refers to Brand X. In a subsequent displayed frame during fast-forwarding, content from a commercial about a mobile phone is displayed while the embedded content continues to refer to Brand X. In another subsequently displayed frame during fast-forwarding, content from a commercial about a computer is displayed while the embedded content continues to refer to Brand X. Thus, because the normal commercial content of a given commercial is only displayed for a fraction of a second during fast-forwarding but the embedded content is repeatedly displayed, the viewer is likely to absorb the embedded content. Again, with the partial frame, the content may change slightly from one pertinent point to the next to give the appearance of motion of the text or objects.

In the example of FIG. 6B, the partial frames of commercial content that are embedded so as to share the frame with the normal commercial content could be included in all frames of the commercial break rather than only being included for a desired duration at each of the pertinent points as shown in FIGS. 5A-5D. This would ensure that the viewer would see the embedded commercial content for every displayed frame during fast-forwarding. However, to lessen the impact on the viewer who is watching the commercial in normal playback speed, either because the viewer is watching the program in regular time without or without a PVR or VOD service or because the viewer is watching a recorded program but simply chooses not to fast-forward, the embedded content may be included only at the pertinent points in playback time. This results in the embedded content not continually being displayed during the normal playback.

Figure 6C:
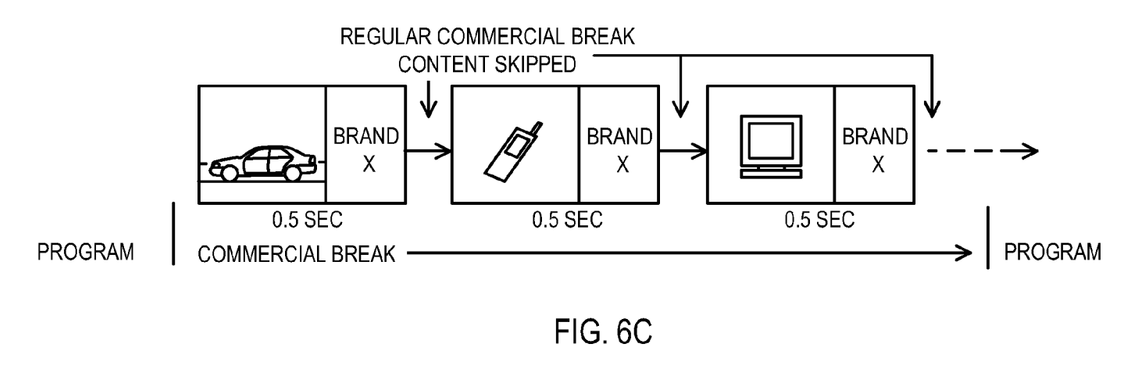

FIG. 6C shows a situation where the television channel being watched is broadcasting a 16:9 widescreen aspect ratio. Much of the commercial content remains in the 4:3 aspect ratio. Conventionally, the 4:3 aspect ratio commercial content is centered within the 16:9 aspect ratio frame resulting in blank side bars. This blank space may be utilized to embed commercial break content. Furthermore, as shown in FIG. 6C, the 4:3 aspect ratio commercial may be pushed to one side of the 16:9 aspect ratio frame leaving a significant portion of the 16:9 aspect ratio frame for inclusion of the embedded commercial break content. Again, with the partial frame filling the remaining portion of the 16:9 aspect ratio frame, the content may change slightly from one pertinent point to the next to give the appearance of motion of the text or objects.

As with the example of FIG. 6B, the example of FIG. 6C allows the simultaneous display of the normal commercial content and the embedded commercial content. Thus, the embedded commercial content could be included in every frame being displayed during the commercial break to ensure that the viewer who is fast-forwarding sees the embedded commercial content in every frame being displayed. Alternatively, the embedded commercial content may be embedded for a duration at each of the pertinent points so that the viewer who is not fast-forwarding does not continually see the embedded commercial content during the commercial break.

Figure 6D:
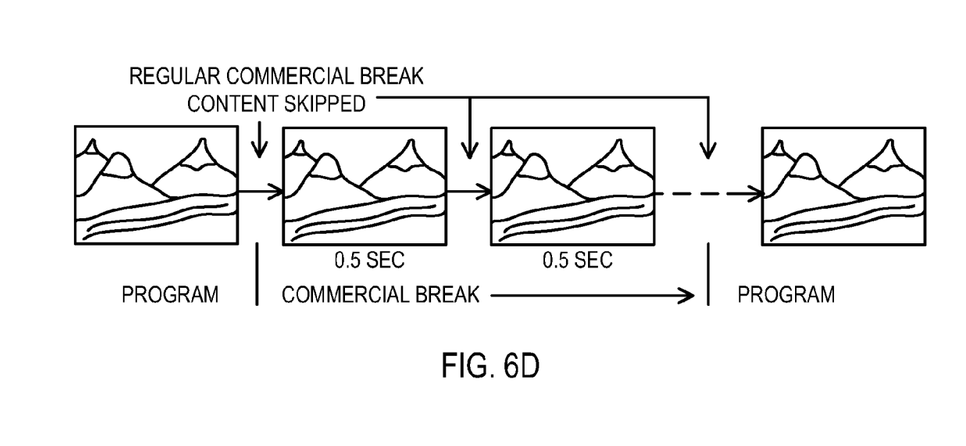

In the example of FIG. 6D, the commercial break content that is being embedded is not commercial content. Instead, the commercial break content is content taken from the program being watched. In this particular example, the program being watched is about mountain scenery and so frames containing mountain scenery are embedded at each of the pertinent points. It may be desirable to have the embedded content of frames from the program being watched be full frames that fill the display screen so that the viewer cannot distinguish these embedded frames from those actually present within the program. Accordingly, as the viewer fast-forwards during the commercial break, at least some of the embedded frames from the program being watched are displayed.

When fast-forwarding through the commercial break, the viewer sees these frames from the program and mistakenly believes that the commercial break has ended. As a result, the viewer stops the fast-forwarding in order to return to normal playback speed of the program. However, because the commercial break is not really over, the viewer then sees the commercial break in normal playback speed. The viewer may become frustrated by the inability to distinguish commercial breaks from the program being watched during fast-forwarding and may stop fast-forwarding altogether. In that case, the commercial break will be displayed in normal playback speed such that the viewer will be exposed to the commercial content as intended by the advertiser.

As described herein, embedding commercial break content into the video stream being displayed to the viewer during fast-forwarding may assist in conveying content to the viewer who might otherwise absorb little to no content during fast-forwarding through a commercial break.

While embodiments have been particularly shown and described, it will be understood by those skilled in the art that various other changes in the form and details may be made therein without departing from the spirit and scope of the invention.

What is claimed is:

1. A method of providing content for a commercial break during the fast-forwarding of a video stream, comprising:
   providing content for the commercial break of the video stream; and
   outputting from a television network broadcasting point the video stream having a plurality of sets of a plurality of frames present within the commercial break of the video stream, with each frame of a given set of frames being consecutive while being output from the television network broadcasting point by being output immediately before or after an adjacent frame of the given set of frames is being output and with each frame of the given set of frames containing identical textual content for the commercial break, with the outputting of the video stream occurring prior to fast forwarding of the video stream by a video recording device that receives the video stream after the video stream is output from the television network broadcasting point and with each set of the frames being positioned at a respective point within the video stream that corresponds to a fast forward display point within the video stream by the video recording device that is capable of recording and fast-forwarding through the video stream, each respective point within the video stream being separated from an adjacent respective point within the video stream that corresponds to a fast forward display point with at least some video frames of the commercial break other than the plurality of frames from the plurality of sets of frames being located between the adjacent respective points within the video stream.

2. The method of claim 1, further comprising distributing the video stream through a communication network.

3. The method of claim 1, wherein the textual content for the commercial break in frames of one set of the plurality is different than the textual content for the commercial break in frames of an other set of the plurality.

4. The method of claim 3, wherein the textual content for the commercial break in frames of the one set of the plurality is identical to the textual content for the commercial break in frames of a subsequent set of the plurality.

5. The method of claim 1, wherein the textual content for the commercial break in the frames of one set of the plurality is identical to the textual content for the commercial break in the frames of all other sets of the plurality.

6. The method of claim 1, wherein the plurality of points occur at regular time intervals.

7. The method of claim 1, wherein the plurality of points are spaced in time over the entire commercial break segment.

8. The method of claim 1, wherein the textual content of one frame for the commercial break has a different position than the textual content of another frame for the commercial break.

9. The method of claim 1, wherein the textual content for the commercial break is present within a defined partial frame portion of a full frame for the commercial break.

10. The method of claim 1, wherein the textual content for the commercial break is present within a full frame for the commercial break.

11. A computer system for generating a video stream including content for a commercial break, comprising:
   at least one input device;

an output device present at a television network broadcasting point and having a coupling to a television network broadcasting device; and a processor configured to receive commercial video and commercial break content via the at least one input device, to create a commercial break segment by generating the video stream that has a plurality of sets of a plurality of frames present within the commercial break of the video stream, with each frame of a given set of frames being consecutive while being provided to the output device at the television network broadcasting point by being output immediately before or after an adjacent frame of the given set of frames is being output and with each frame of the given set of frames containing identical textual content for the commercial break, with the outputting of the video stream occurring prior to fast forwarding of the video stream by a video recording device that receives the video stream after the video stream is sent from the television network broadcasting device, and with each set of the frames being positioned at a respective point within the video stream that corresponds to a fast forward display point within the video stream by the video recording device that is capable of recording and fast-forwarding through the video stream, each respective point within the video stream being separated from an adjacent respective point within the video stream that corresponds to a fast forward display point with at least some video frames other than the plurality of frames from the plurality of sets of frames being located between the adjacent respective points within the video stream, and the processor being further configured to output the video stream containing the plurality of sets of the plurality of frames via the output device.

12. The computer system of claim 11, wherein the at least one input device comprises a data input port.

13. The computer system of claim 11, wherein the at least one output device comprises a data output port.

14. The computer system of claim 11, wherein the at least one input device comprises a storage medium.

15. The computer system of claim 11, wherein the at least one output device comprises a storage medium.

16. The computer system of claim 11, wherein the textual content for the commercial break in frames of one set of the plurality is different than the textual content for the commercial break in frames of an other set of the plurality.

17. The computer system of claim 16, wherein the textual content for the commercial break in frames of the one set of the plurality is identical to the textual content for the commercial break in frames of a subsequent set of the plurality.

18. The computer system of claim 11, wherein the textual content for the commercial break in the frames of one set of the plurality is identical to the textual content for the commercial break in the frames of all other sets of the plurality.

19. The computer system of claim 11, wherein the plurality of points occur at regular time intervals.

20. A method of providing content for a commercial break during the fast-forwarding of a video stream, comprising:

providing content for the commercial break of the video stream; and outputting from a television network broadcasting point the video stream having a plurality of sets of a plurality of frames present within the commercial break of the video stream, with each frame of a given set of frames being consecutive while being output from the television network broadcasting point by being output immediately before or after an adjacent frame of the given set of frames is being output and with each frame of the given set of frames containing identical textual content for the commercial break, with the outputting of the video stream occurring prior to fast forwarding of the video stream by a video recording device that receives the video stream after the video stream is output from the television network broadcasting point and with each set of the frames being positioned at a respective point within the video stream that corresponds to a fast forward display point within the video stream by the video recording device that is capable of recording and fast-forwarding through the video stream, each respective point within the video stream being separated from an adjacent respective point within the video stream that corresponds to a fast forward display point with at least some video frames of the commercial break other than the plurality of frames from the plurality of sets of frames being located between the adjacent respective points within the video stream, with the position of the textual content being positioned differently within the frame from one fast forward display point to the next to give the appearance of motion of the textual content.

* * * * *